March 12, 1929.　　　E. C. FRITTS ET AL　　　1,704,794

PHOTOGRAPHIC PROJECTION PRINTER

Filed Sept. 17, 1927　　　2 Sheets-Sheet 1

FIG. 1.

Edwin C. Fritts and
Kenneth C. D. Hickman, Inventors

R. L. Stuchfield
By N. M. Parsons

Attorney

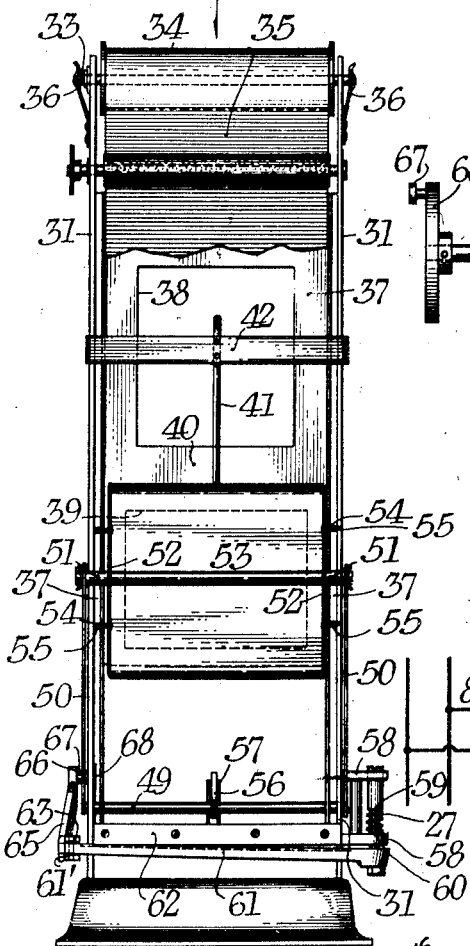
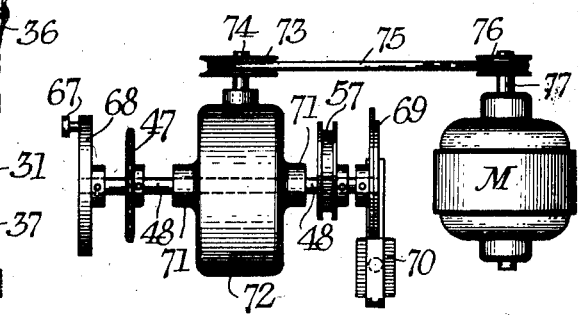
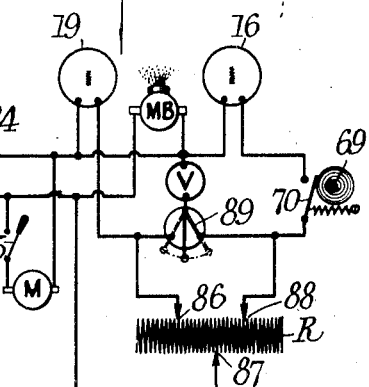

Patented Mar. 12, 1929.

1,704,794

UNITED STATES PATENT OFFICE.

EDWIN C. FRITTS AND KENNETH C. D. HICKMAN, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC PROJECTION PRINTER.

Application filed September 17, 1927. Serial No. 220,115.

This invention relates to a photographic projection printer, and more particularly to an apparatus of this type designed to make in succession a large number of enlarged prints from a single frame of a motion picture film. The objects of the invention are in particular to provide means for passing the paper intermittently and quickly past the exposure position, to provide an illuminating system whereby the image may be projected by non-actinic light by a beam identical except as to color with the printing light, and to provide mechanism for causing the actuation of the several parts of the apparatus in timed relation with the illumination of the printing light. Other objects and advantages will appear from the following description wherein reference is made to the accompanying drawing, and wherein Fig. 1 is a side view of our improved apparatus parts being shown in section;

Fig. 2 is an end view looking from the right of Fig. 1;

Fig. 3 shows certain mechanical details;

Fig. 4 is a diagram of the electrical circuits;

Fig. 5 is a diagram showing the timed relation of the several parts.

Upon the horizontal base 1 is a suitable supporting standard 2 carrying posts 3 and 4 upon which may be mounted motion picture reels 5 and 6, the upper reel containing a supply of film and the lower reel being the takeup reel. The latter is keyed to its supporting post being free to turn and being driven by a belt 26 passed over suitable pulleys on the post 4 and a suitable shaft 7 carrying a handle 8, the film passing between the reels being guided by idle rolls 9 past an exposure window 10. This is carried on the front of the housing 11 passing through a supporting back casing 12.

Immediately behind the window is a diffusing screen 13 and behind this are condensing lenses 14 by which rays from the filament 15 of an electric lamp 16 supported in the base 17 are projected to the opal glass. Behind this lamp is a lens system 18, and behind this in turn is a second lamp 19 supported in a socket 20. The filaments 15 and 21 of the lamps 16 and 19 respectively are at the conjugate foci of the lens system 18. At any position between the lamps, and here shown as between the lens elements, is a filter 22 transmitting only photographically non-actinic light.

At a suitable distance from the above described projection system is an easel support 30 comprising two side standards 31, the upper ends of which are notched at 32 to carry a cross rod 33 upon which is a roll 34 of a sensitized material such as paper 35. Springs 36 act as centering means and brakes for the rod 33.

Between the standards 31 is a cross plate 37 having rectangular apertures 38 and 39 leaving the crossbar 40 between them. An arm 41 is attached at its upper end to a U-shaped cross bar 42, the ends of which are supported by the standards 31. This rod 41 is forwardly inclined, and at its lower end terminates just above the window 39 opposite the cross bar 40. Just beneath the roll of paper 35 are located an idle press roll 43 and a driven roll 44, the latter having a sprocket 45 over which passes a chain 46 driven from a sprocket 47 on the shaft 48 to be later described.

A cross rod 49 is pivotally mounted in the standards 31, and at its outer ends, outside of the standards, carries rigidly arms 50 connected at their upper ends to a cross rod 51, the latter passing through flanges 52 of a presser-back 53. This presser-back carries at its sides outwardly extending pins 54 to which are attached springs 55 connected to the frame 37 and operating to pull the presser member 53 into contact therewith against and around the window 39.

At its center a rod 49 carries an arm 56, the upper end of which lies upon the cam 57 carried upon the shaft 48. A vertical shaft 27 is rotatably supported in the projections 58 extending from one of the standards 31. This is normally pressed upwardly by the spring 60 engaging the shoulder 59 and the lower projection 58. A cutting blade 61 is carried on the lower end of this shaft, and extends behind the support 30 in operative relation to the fixed cutting blade 62. The other end of blade 61 is pivotally connected at 61' with a link 63 which is pivoted at 64 to an arm 65 pivoted by means of a link 66 to a stud 67 on the disk 68 on the shaft 48. Also carried by shaft 48 is a cam 69 engaging a spring pressed switch arm 70. The shaft 48 is mounted in the bearings 71 of a casing 72 containing reduction gearing (not shown) and driven through shaft 73, pulleys 74, belt 75, pulley 76, and shaft 77 from a motor M which is carried by the support 1. A motor blower MB is carried in the casing 12 for forcing air through it for the purpose of ventilation, baffles 80 and apertures 81 being provided.

The electrical system comprises the main supply lines 82 and 83 with the main switch 84. The motor M and motor blower MB are connected directly across the supply lines, an additional switch 85 being supplied for the motor M. Lamp 19 is connected across the main lines through a portion of resistance R, the current of this lamp being controlled by the adjustable points 86 and 87. Lamp 16 is connected across a sprocket through the portion of the resistance R, current being controlled by the adjustable contact points 87 and 88, this circuit including switch 70. The voltage applied to either lamp may be measured by the volt meter V and the three-way switch 89.

The operation and advantageous features of the structure will now be pointed out. The paper 35 is fed downwardly between the rolls 43 and 44 and past the window 39. As the shaft 48 rotates the cam 57 will intermittently lift the arm 56, throw the presser-back 53 away from the window 39 against the tension of the springs 55, the latter causing the return of the pressure-back as the cam permits the arm 56 to fall. This pressure holds the paper in position at the window 39 for an exposure to be made. While the paper is thus held stationary a further supply continues to be fed and gathers in a loop 90 the lower part of which is supported by an inclined rod 41. The paper has very slight resilience if any, and would sag considerably if unsupported. When the pressure is again retracted this loop will fall by gravity at once, and thus furnish a new supply of paper to be exposed. Since the paper generally used for such purposes has a very glossy surface that is easily marred, it is important that it be moved with the slightest possible friction, and the above described apparatus is very efficient for this purpose. As the presser 53 has engaged the paper, the switch 70 which has been opened during the movement of the paper is closed, and lamp 16 is lighted. The switch 70 is maintained closed during the greater part of the period when the presser-back holds the paper; but it opens somewhat before the presser is released, and at once the knife blade 61 operates to cut the paper while it is still stationary. As soon as this cutting is completed the presser is released and a new supply of paper falls.

The lighting system which has been described is an important part of our invention, since it enables the operator at all times to view the projected image. The rays from the filament 21 being focused at the position of the filament 15 proceed to the diffusing glass 13 over exactly the same path as rays emanating originally from the filament 15. It is, of course, desirable for the operator to judge the image before it is actually printed, and by this expedient it is not necessary to substitute one lamp for another, to insert movable filters into the optical system which would somewhat modify it, or to illuminate it from a source entirely out of the optical system used for printing. This apparatus is intended for very rapid work, it being possible to make exposures at a speed of the order of one a second. It is not desirable, therefore, to have to be turning on and off the red light whenever a new negative is to be changed. The present arrangement provides an apparatus that is simple and easy of operation, and fulfills all the requirements of the projection printer for this purpose. In Fig. 5 is shown diagrammatically the timed relation of the several parts. The line A indicates the continuous feeding by the roll 44. Line B indicates at the heavy portion the time when the presser 55 is held at the exposure gate, and by the light portion the period during which it is moving to and from the window. The line C indicates at the heavy portion the period during which the switch 70 is closed, and the exposure being made, and by the light portion the period during which the switch is open. Line D indicates in its heavy portion the time during which the blade 61 is in actual cutting relation with the bar 62, and the light portion indicates the period during which the blade though moving is not cutting.

Considering the cycle as measured by degrees, the relative times of the several operations can be readily visualized.

Since the engagement of the cutter with the paper imparts a certain amount of vibration thereto, the cutting action should take place when the printing light is off, so as not to produce a blurred image.

We consider as included in our invention all such modifications and equivalents as are included within the scope of the appended claims.

Having thus described our invention, what we claim as new and desire to secure by Letters Patent is,—

1. In a photographic projector printer, in combination, an easel, means for feeding sensitive material intermittently past said easel, an exposure window, an objective for projecting an image from said window to said easel, means for illuminating said window comprising two spaced light sources, a lens system between the lamps, the light sources being situated at the conjugate foci of the lens system, a filter between the lamps transmitting only non-actinic light and means for eliminating the light source nearer the window during the intermittent movement of the sensitive material.

2. In a photographic projection printer, in combination, an easel, means for feeding a band of sensitive material, a projection system for projecting an image upon said easel and comprising an illuminating system, an exposure window and a projection objective in optical alignment, the illuminating system comprising two spaced electric lamps, a lens system between the lamps, said lamps having their light sources at the conjugate foci of the lens system and in the optical axis of the projection system, a filter between the lamps transmitting only non-actinic light, electrical circuits for said lamps, a switch controlling the circuit of the lamp nearer the window and interconnected mechanism for operating said switch and said band feeding means and operative to open said switch when the band is being moved.

3. In a photographic projection printer, in combination, an easel for the support of sensitized material, a projection system for projecting an image upon said easel and comprising an exposure window, a projection objective and an illuminating system in optical alignment, the illuminating system being behind the window and comprising two separated electric lamps, a lens system between the lamps and a filter transmitting only non-actinic light, the light sources of the two lamps being at conjugate foci of the lens system, separate circuits including the two lamps and a switch controlling the circuit including only the lamp nearer the window, whereby the window may be illuminated by non-actinic light from the rear lamp only proceeding from the position of the front lamp.

4. In a photographic projection printer, in combination, an easel for the support of sensitized material, a projection system for projecting an image upon said easel and comprising an exposure window, a projection objective and an illuminating system in optical alignment, the illuminating system being behind the window and comprising two separated electric lamps, a lens system between the lamps and a filter transmitting only non-actinic light, the light sources of the two lamps being at conjugate foci of the lens system, separate circuits including the two lamps and a switch controlling the circuit including only the lamp nearer the window, whereby the window may be illuminated by non-actinic light from the rear lamp only proceeding from the position of the front lamp, and interconnected mechanisms for opening said switch at uniformly timed intervals and for simultaneously advancing sensitized materials past said easel.

5. In a photographic projection printer, in combination, an easel for the support of sensitized material, a projection system for projecting an image upon said easel and comprising an exposure window, a projection objective and an illuminating system in optical alignment, the illuminating system being behind the window and comprising two separate electric lamps, a lens system between the lamps and a filter transmitting only non-actinic light, the light sources of the two lamps being at conjugate foci of the lens system, separate circuits including the two lamps and a switch controlling the circuit including only the lamp nearer the window, whereby the window may be illuminated by non-actinic light from the rear lamp only proceeding from the position of the front lamp, mechanism for opening and closing said switch at timed intervals, mechanism for intermittently advancing strip material past said easel and a continuously driven common actuating means for both said mechanism arranged to cause the advancement of the strip material during the intervals when the switch is open.

Signed at Rochester, New York, this 13th day of September, 1927.

EDWIN C. FRITTS.
KENNETH C. D. HICKMAN.